(12) United States Patent
Ragland

(10) Patent No.: US 8,696,272 B1
(45) Date of Patent: Apr. 15, 2014

(54) WHEEL CHOCK

(71) Applicant: Lonnie P. Ragland, Auburn, IL (US)

(72) Inventor: Lonnie P. Ragland, Auburn, IL (US)

( * ) Notice: Subject to any disclaimer, the term of this patent is extended or adjusted under 35 U.S.C. 154(b) by 0 days.

(21) Appl. No.: 13/967,510

(22) Filed: Aug. 15, 2013

Related U.S. Application Data

(60) Provisional application No. 61/692,265, filed on Aug. 23, 2012.

(51) Int. Cl.
*B60P 3/077* (2006.01)

(52) U.S. Cl.
USPC .............................. 410/30; 410/19

(58) Field of Classification Search
CPC ............ B60P 3/00; B60P 3/075; B60P 3/077; B60P 7/0892; B60P 7/135; B60T 1/14; B60T 3/00; B61H 7/10; B62H 3/08
USPC ....... 410/3, 7, 9, 30, 49; 188/4 R, 32; 211/20, 211/21, 22
See application file for complete search history.

(56) References Cited

U.S. PATENT DOCUMENTS

| 6,585,211 | B1 | 7/2003 | Hageman et al. | |
| 7,959,389 | B2 * | 6/2011 | Fischer | 410/7 |

OTHER PUBLICATIONS

Triton wheel chock model #14114 sold by Triton Corporation, Hartford, Wisconsin. Retrieved from Internet URL: www.tritontrailers.com on Feb. 6, 2013. Date of first appearance on website unknown.

* cited by examiner

*Primary Examiner* — Stephen Gordon
(74) *Attorney, Agent, or Firm* — Philip L. Bateman

(57) ABSTRACT

A wheel chock comprises a tray and a folding cover. The cover contains three sections that are connected by hinges. When the cover is in a retracted position, it forms a flush solid surface. When the cover is in a raised functional position, its front section forms a sloped wheel platform and its middle and rear sections form a wedge.

12 Claims, 4 Drawing Sheets

WHEEL CHOCK

CROSS-REFERENCE TO RELATED APPLICATION

This application claims the benefit of U.S. Provisional Application Ser. No. 61/692,265, Aug. 23, 2012.

FIELD OF THE INVENTION

This invention relates to wheel and ground brakes. More particularly, this invention relates to wheel chocks.

BACKGROUND OF THE INVENTION

Wheel chocks are wedge-shaped objects that are placed against one or more of the wheels of a wheeled vehicle to restrain movement when the vehicle is parked. Some wheel chocks are portable while others are mounted in a fixed location, such as the floor in a trailer. When fixed in location, it is desirable for the wheel chock to have two positions—a raised position in which the wheel chock restrains the wheel and a retracted position in which the wheel chock is flush, or nearly flush, with the floor. Placing the wheel chock in the retracted position allows a trailer to be used for purposes other than transporting the wheeled vehicle without the wheel chock causing any interference. It also eliminates the danger of a person tripping over the wheel chock.

Various two-position wheel chocks have been disclosed. For example, Hageman et al., U.S. Pat. No. 6,585,211, Jul. 1, 2003, discloses a two-position wheel chock having a ramped base and a chock formed of three pivotably connected sections (a slider, an engaging member, and two rails) that can be moved along the base to the desired location. Once in the desired location, the engaging member and the rails are raised upward to form a wedge. The Hageman et al. wheel chock lacks a recess into which the wheel rests so some mechanism is necessary to hold the wheel against the wheel chock. The Hageman et al. wheel chock also lacks any mechanism to hold a two wheeled vehicle (e.g., a motorcycle) in the upright position.

As another example, the Triton Corporation of Hartford, Wis. sells a wheel chock having a recess and a flush cover that pivots upward to form an angled stop. The Triton model no. 14114 wheel chock is shown at the Triton Corporation website at www.tritontrailers.com. The Triton wheel chock does not accommodate vehicles having wide tires because the tires do not fit into the narrow recess. The Triton wheel chock also lacks any mechanism to hold a two wheeled vehicle in the upright position.

Accordingly, there is a demand for a wheel chock that retracts to a flush position, that has a platform into which tires of any width can fit, and that has an optional means for holding a two wheeled vehicle in the upright position.

SUMMARY OF THE INVENTION

The general object of this invention is to provide an improved wheel chock. More particular objects are to provide a wheel chock retracts to a flush position, that has a platform into which tires of any width can fit, and that has an optional means for holding a two wheeled vehicle in the upright position.

I have invented an improved wheel chock. The wheel chock comprises a tray and a folding cover. The first component of the wheel chock, the tray, comprises: (1) a horizontal base; (2) a vertical front wall; (3) a vertical rear wall; (4) a vertical left wall having a horizontal guide; and (5) a vertical right wall having a horizontal guide. The base and the walls define a recess with an open top and an upper perimeter.

The second component of the wheel chock, the folding cover, comprises: (1) a front section having a front, a rear, a left side, and right side, the left side and right side having members that engage the horizontal guides of the left and right walls of the tray, the front section being movable between a first retracted position in which its front is adjacent the front wall of the tray and in which it is in the plane defined by the open top of the tray, and a second functional position in which the front is spaced apart from the front wall of the tray and in which it is angled downwardly at an angle of about 2 to 20 degrees; (2) a middle section having a front, a rear, a left side, and a right side, the front of the middle section being hingedly connected to the rear of the front section, the middle section being movable between a first retracted position in which it is in the plane defined by the open top of the tray, and a second functional position in which it is angled upwardly at an interior angle of about 30 to 75 degrees; and (3) a rear section having a front, a rear, a left side, and right side, the left side and right side having members that movably engage the left and right walls of the tray, the front of the rear section being hingedly connected to the rear of the middle section, the rear section being movable between a first retracted position in which its rear is adjacent the rear wall of the recess and in which it is in the plane defined by the open top of the tray, and a second functional position in which it is angled upwardly at an interior angle of about 30 to 90 degrees.

A third, optional component of the wheel chock is a removable wheel yoke. The yoke comprises two upwardly angled spaced apart members and a vertical support. The members have proximate ends that connect to the tray and have distal ends that connect to the vertical support. The vertical support has a proximate end that connects to the tray.

The folding cover of the wheel chock is movable between a first retracted position and a second functional position. The wheel chock of this invention is flush with the floor in its retracted position, has a recess into which tires of any width can fit in its functional position, and optionally has a means for holding a two wheeled vehicle in the upright position.

DETAILED DESCRIPTION OF THE INVENTION

Figure 1:
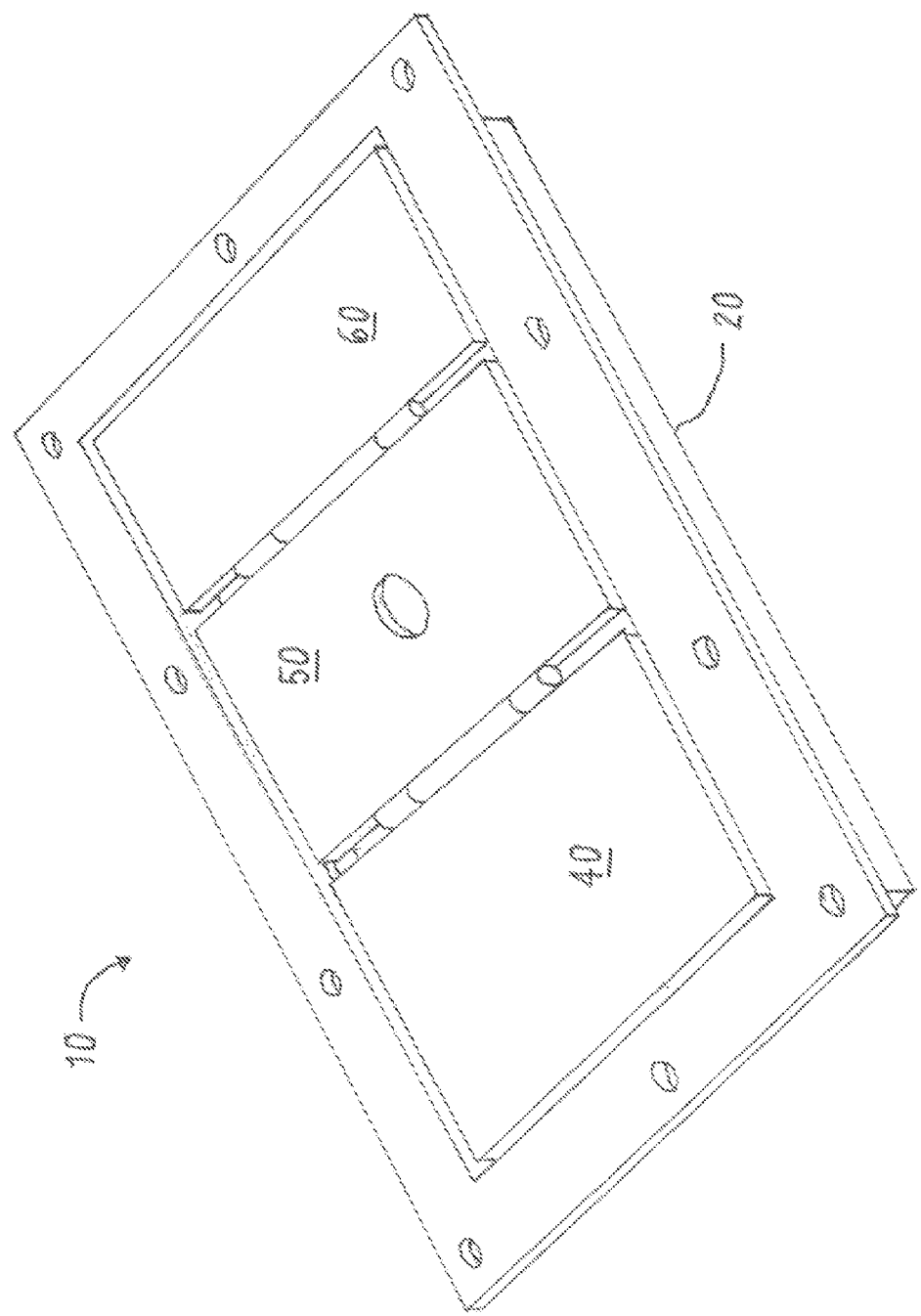
FIG. 1 is a top, front, and right side perspective view of the wheel chock of this invention in the retracted, flush position.

This invention is best understood by reference to the drawings. A preferred embodiment of the wheel chock 10 of this invention comprises a tray 20 and a cover 30. The cover is formed of three sections, a front section 40, a middle section 50, and a rear section 60. The wheel chock optionally contains a yoke 70. The components of the wheel chock are discussed in detail below.

The tray 20 has a horizontal base 21, a vertical front wall 22, a vertical rear wall 23, a vertical left wall 24, and a vertical right wall 25. The terms "horizontal" and "vertical" are used herein to describe approximate orientations rather than their exact geometric definitions. The base is defined by the lower horizontal plane of the tray. The base is generally a solid sheet or plate, as in the preferred embodiment, or is made of one or more cross members, flanges, lips, or the like. These bases provide structural strength to the tray. If the base is completely open, the walls are made thicker or ribbed to provide the necessary structural strength. The base and the walls define a recess having an open top. In the preferred embodiment, a flange 26 extends around the upper perimeter of the recess. The flange may be continuous, as in the preferred embodiment, or may consist of one or more discrete portions. The flange preferably contains multiple holes for securing the tray to a surface such as a wooden floor in a trailer. The left wall and the right wall have horizontal guides 27 that, as explained in detail below, engage two sliding pins on each side of the front section of the cover. In the preferred embodiment, the guides consist of slots cut into the walls. Brackets, channels, and the like are also suitable.

The size of the tray is a matter of choice that depends on the types of vehicles likely to be restrained by the wheel chock. For most conventional motorcycles and four wheeled all terrain vehicles, the tray is generally about 4 to 24 inches, preferably about 6 to 16 inches, in width, about 8 to 30 inches, preferably about 10 to 24 inches, in length, and about 1 to 6, preferably about 2 to 4 inches, in depth. The tray is made of a durable and strong material. Metals such as steel and aluminum are preferred for their strength. Steel plate having a thickness of about 0.05 to 0.20 inches is most preferred for its low cost and strength. Steel plate is preferably painted or otherwise coated to reduce rust.

The cover 30 completely covers the open top of the tray when in the retracted position and forms both a wheel platform and a wedge in the functional position. The cover is formed of three sections, a front section 40, a middle section 50, and a rear section 60. The three sections are connected together by two sets of hinges. The first hinge 70 connects the front section to the middle section and the second hinge 80 connects the middle section to the rear section. The hinged connections enable the three sections to lay flat or to form angles with respect to each other.

Figure 2:
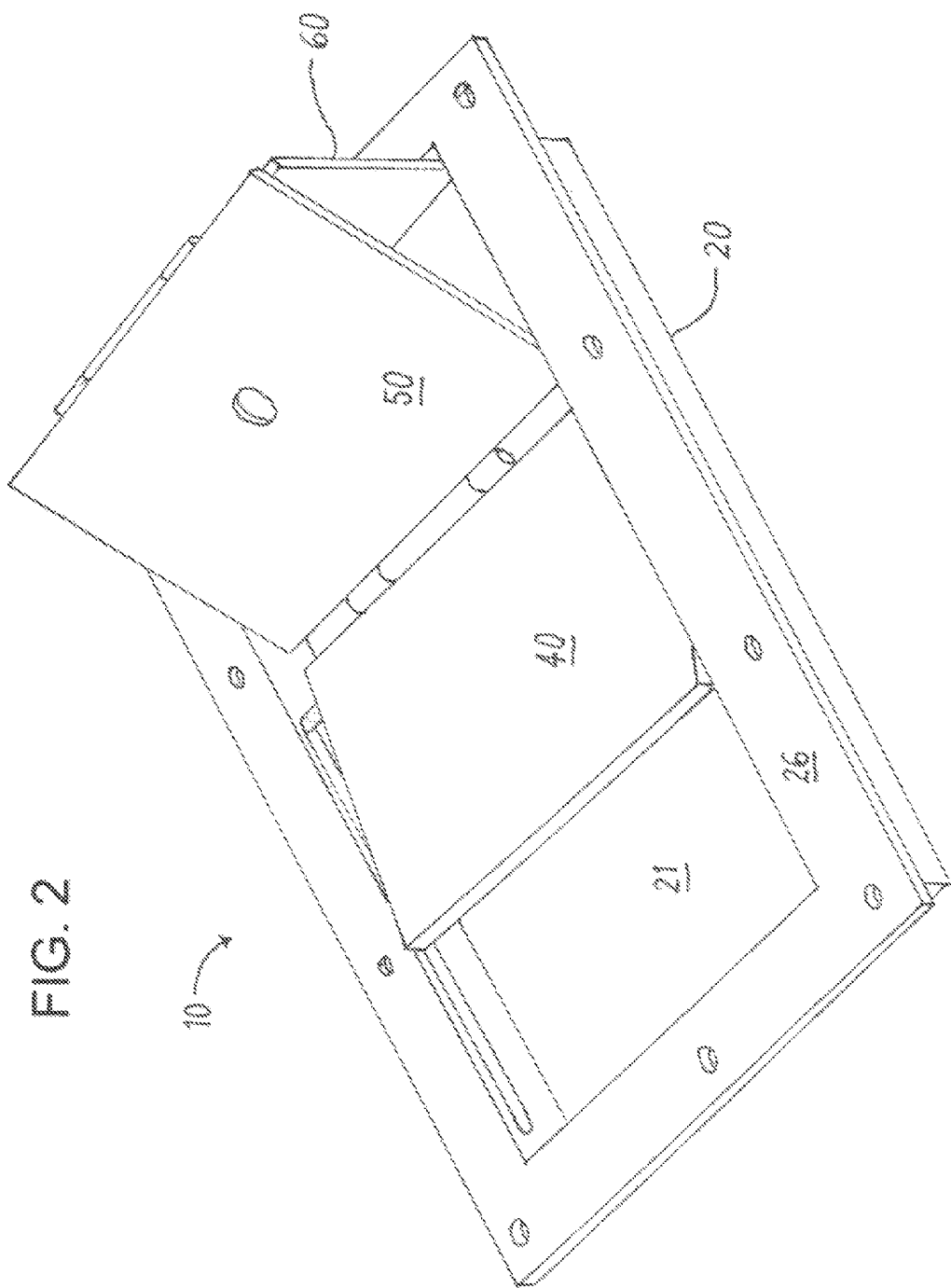
FIG. 2 is a top, front, and right side perspective view thereof in the raised, functional position.
Figure 4:
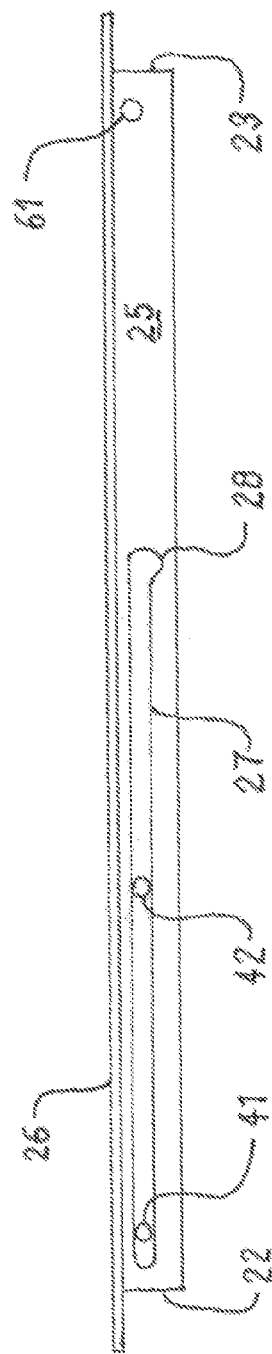
FIG. 4 is a right side elevation view thereof in the retracted, flush position.
Figure 5:
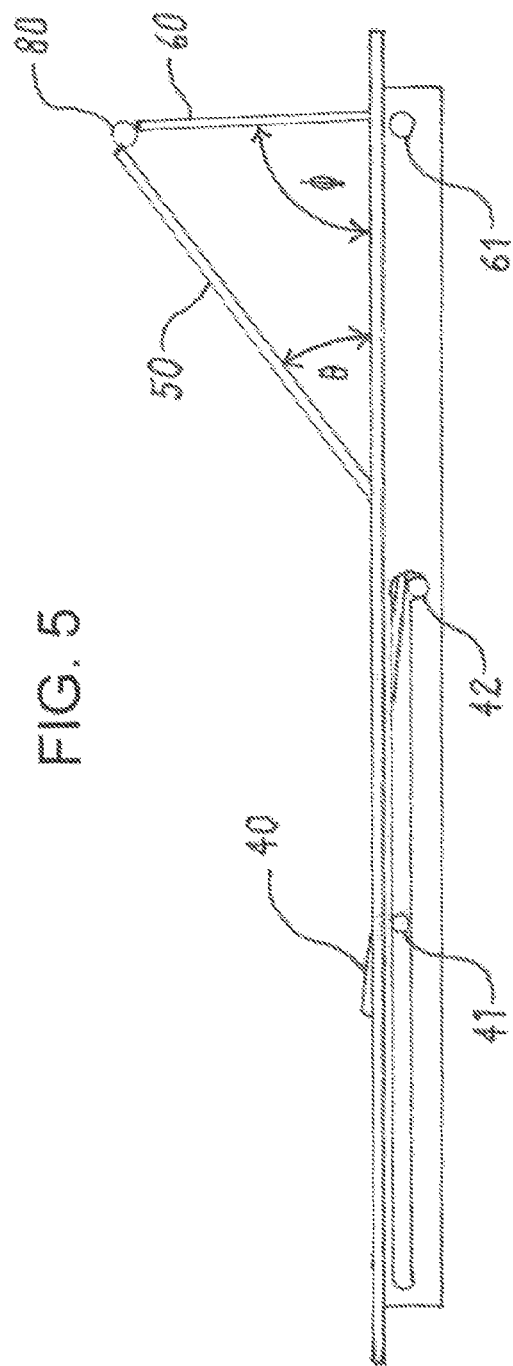
FIG. 5 is a right side elevation view thereof in the raised, functional position.

More particularly, the front section 40 of the cover is movable between the first retracted position shown in FIGS. 1 and 4 and the second functional position shown in FIGS. 2 and 5. In the first position, the front section is adjacent the front wall of the tray. In the second position, the front section is spaced apart from the front wall. The front section has a two sliding pins 41 and 42 or other engaging members on each side that slide along the slots in the side walls of the tray. In the preferred embodiment, the sliding pins consist of two rods that are welded to the underside of the front section. The two rods have a width slightly greater than the width of the front section so they extend outwardly into the slots. When the front section is moved to its functional position, its two rear sliding pins dip into the downward recesses 28 at the rearward ends of the slots. This movement causes the rear of the front section to dip below the plane defined by the flange so that the entire section becomes angled downwardly at an angle of about 2 to 20 degrees, most preferably about 5 to 10 degrees, relative to horizontal. In this position, the front section forms a sloped platform for the wheel of the wheeled vehicle being restrained on the wheel chock. The slope causes the wheel to rest tightly against the wedge formed by the other two sections. The slope also impedes rearward movement of the vehicle away from the wheel chock.

The middle section 50 of the cover is also movable between the first retracted position shown in FIGS. 1 and 4 and the second functional position shown in FIGS. 2 and 5. The middle section preferably contains a central opening 51 which provides a convenient means for gripping and raising the cover into the functional position. In the functional position, the middle section is angled upward at an interior angle θ of about 20 to 60 degrees, preferably about 30 to 50 degrees. In this position, the middle section forms the front face of the wedge that contacts the wheel of the wheeled vehicle. There are no sliding pins on the middle section in the preferred embodiment.

The rear section 60 of the cover is also movable between the first retracted position shown in FIGS. 1 and 4 and the second functional position shown in FIGS. 2 and 5. In the functional position, the rear section is angled upward at an interior angle φ of about 30 to 90 degrees. In this position, the rear section forms the rear face of the wedge. The rear section has a pivoting pin 61 or other engaging members on each side that engages holes in the side walls of the tray. The pins form the pivot point for the rear section and are preferably located near the rear. It can be appreciated that the pin engage the side walls in a way that allows them to rotate as the rear section is raised. In the preferred embodiment, the pivoting pins are formed by welding a rod to the underside of the rear section. The rod has a width slightly greater than the width of the rear section so it extends outwardly into the holes.

The use of the wheel chock can now be considered. The wheel chock is preferably mounted into an opening in the floor of a trailer with the flange of the tray flush against the surface of the floor. If flush mounting is not practical, the wheel chock can be surface mounted by placing it onto a floor and securing it in any suitable manner. If surface mounted, a ramp is preferably added to the front of the tray. The ramp may be permanently or removably attached to the tray. In any event, the wheel chock is flush, or nearly flush, with the surface of the floor when in its retracted position.

When a wheeled vehicle is to be restrained, the cover of the wheel chock is moved to its functional position. A wheel of the wheeled vehicle is then positioned onto the sloped front section of the cover and against the middle section of the cover. The wheel chock prevents any further forward movement of the wheeled vehicle and impedes rearward movement. Rearward movement of the wheeled vehicle is further impeded, if desired, by applying a brake to the wheeled vehicle, by placing portable wheel chocks on the rear of a wheel, and/or by otherwise securing the vehicle to a stationary object.

Figure 3:
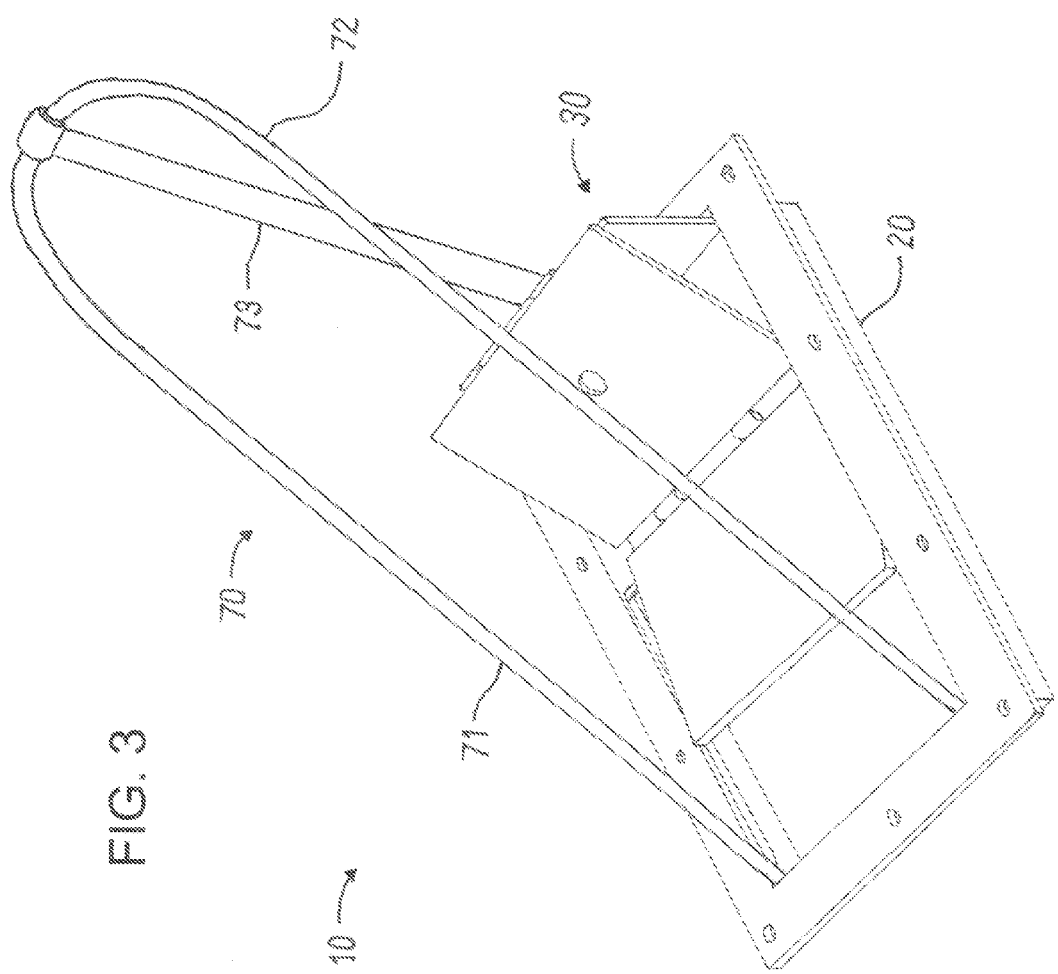
FIG. 3 is a top, front, and right side perspective view thereof with the optional yoke in place.

Referring now to FIG. 3, an optional, additional component of the wheel chock is a yoke 90. The yoke contains a left upwardly angled member 91 and a right upwardly angled member 92. The lower, proximate ends of the members connect to openings in the front wall of the tray. The upper, distal ends of the members connect to a vertical support 93 whose lower, proximate end connects to an opening in the rear wall of the tray. Other connections between the tray, members, and support are also suitable. For example, for trays having a horizontal flange, the members can connect to the front flange and the support can connect to the rear flange rather than to the respective walls of the tray. The yoke is preferably made of tubular steel. When the yoke is in place, a two-wheeled vehicle such as a motorcycle is both restrained and supported in an upright position by the wheel chock.

The wheel chock has a functional position in which it effectively restrains the movement of a wheeled vehicle. It also has a retracted position in which it is flush with the floor when not in use. The wheel chock has three primary advantages over prior art retractable wheel chocks. First, it has a recess into which tires of any width can fit. Second, the recess is sloped downwardly to help prevent rearward movement of the vehicle. Third, it has an optional yoke for holding a two wheeled vehicle in the upright position.

I claim:

1. A wheel chock comprising:
   (a) a tray having:
      (i) a horizontal base;
      (ii) a vertical front wall;
      (iii) a vertical rear wall;
      (iv) a vertical left wall having a horizontal guide; and
      (v) a vertical right wall having a horizontal guide, the base and the walls defining a recess with an open top and an upper perimeter; and
   (b) a folding cover for the open top of the recess of the tray, the cover being movable between a first, flat, refracted position and a second, raised, functional position, the cover comprising:
      (i) a front section having a front, a rear, a left side, and right side, the left side and right side having members that engage the horizontal guides of the left and right walls of the tray, the front section being movable between a first retracted position in which its front is adjacent the front wall of the tray and in which it is in a plane defined by the open top of the tray, and a second functional position in which the front is spaced apart from the front wall of the tray and in which it is angled downwardly from front to rear at an angle of about 2 to 20 degrees;
      (ii) a middle section having a front, a rear, a left side, and a right side, the front of the middle section being hingedly connected to the rear of the front section, the middle section being movable between a first retracted position in which it is in the plane defined by the open top of the tray, and a second functional position in which it is angled upwardly at an interior angle of about 30 to 75 degrees; and
      (iii) a rear section having a front, a rear, a left side, and right side, the left side and right side of the rear section having members that rotatably engage the left and right walls of the tray, the front of the rear section being hingedly connected to the rear of the middle section, the rear section being movable between a first refracted position in which its rear is adjacent the rear wall of the recess and in which it is in the plane defined by the open top of the tray, and a second functional position in which it is angled upwardly at an interior angle of about 30 to 90 degrees;
   such that, when mounted into a floor with the top of the tray in a plane of the floor, the wheel chock forms a flush, solid surface when the cover is in the first retracted position, and forms a sloped wheel platform and a wedge when the cover is in the second functional position.

2. The wheel chock of claim 1 wherein the tray additionally comprises a horizontal flange around some or all of the upper perimeter of the recess.

3. The wheel chock of claim 1 wherein the horizontal guides of the left and right walls of the tray comprise slots.

4. The wheel chock of claim 3 wherein the horizontal guides have rearward ends having downward recesses.

5. The wheel chock of claim 1 wherein the base of the tray is solid.

6. The wheel chock of claim 1 additionally comprising a removable wheel yoke comprising two upwardly angled spaced apart members and a vertical support, the angled members having proximate ends that connect to the tray and having distal ends that connect to the vertical support, and the vertical support having a proximate end that connects to the tray.

7. A wheel chock comprising:
   (a) an open topped tray having:
      (i) an upper perimeter;
      (ii) a vertical left wall having a horizontal guide; and
      (iii) a vertical right wall having a horizontal guide; and
   (b) a folding cover for the open top of the tray, the cover being movable between a first, flat, retracted position and a second, raised, functional position, the cover comprising:
      (i) a front section having a front, a rear, a left side, and right side, the left side and right side having members that engage the horizontal guides of the left and right walls of the tray, the front section being movable between a first refracted position in which its front is adjacent a front wall of the tray and in which it is in a plane defined by the open top of the tray, and a second functional position in which the front is spaced apart from the front wall of the tray and in which it is horizontal or angled downwardly from front to rear;
      (ii) a first hinge connected to the rear of the front section;
      (iii) a middle section having a front, a rear, a left side, and a right side, the front of the middle section being connected to the first hinge, the middle section being movable between a first retracted position in which it is in the plane defined by the open top of the tray, and a second functional position in which it is angled upwardly;
      (iv) a second hinge connected to the rear of the middle section; and
      (v) a rear section having a front, a rear, a left side, and right side, the left side and right side of the rear section having members that rotatably engage the left and right walls of the tray, the front of the rear section being connected to the second hinge, the rear section being movable between a first retracted position in which its rear is adjacent a rear wall of the tray and in which it is in the plane defined by the open top of the tray, and a second functional position in which it is angled upwardly.

8. The wheel chock of claim 7 wherein the tray additionally comprises a horizontal flange around some or all of the upper perimeter.

9. The wheel chock of claim 7 wherein the horizontal guides of the left and right walls of the tray comprise slots.

10. The wheel chock of claim 9 wherein the horizontal guides have rearward ends having downward recesses.

11. The wheel chock of claim 7 wherein a base of the tray is solid.

12. The wheel chock of claim 7 additionally comprising a removable wheel yoke comprising two upwardly angled spaced apart members and a vertical support, the angled members having proximate ends that connect to the front of the tray and having distal ends that connect to the vertical support, and the vertical support having a proximate end that connects to the rear of the tray.

* * * * *